ment.

United States Patent
Vogtlin et al.

[15] 3,683,401
[45] Aug. 8, 1972

[54] TACHOGRAPHIC MEASURING AND INDICATING APPARATUS

[72] Inventors: Karl Vogtlin, Villingen; Hermann Holtz, Malmsheim; Norbert Helmschrott, Schwenningen, all of Germany

[73] Assignee: Kienzie Apparate GmbH, Villingen, Germany

[22] Filed: Feb. 3, 1970

[21] Appl. No.: 12,478

[52] U.S. Cl. .......................................346/18, 73/489
[51] Int. Cl. .................................................G01d 9/00
[58] Field of Search ...73/518, 519, 520, 489; 346/18

[56] References Cited

UNITED STATES PATENTS

| | | | |
|---|---|---|---|
| 995,731 | 6/1911 | Stewart | 73/519 |
| 2,244,653 | 6/1941 | Meer | 346/18 |
| 3,205,502 | 9/1965 | Chatelain | 346/18 |
| 2,976,102 | 3/1961 | Palmer | 346/18 |
| 3,213,459 | 10/1965 | Bramsch et al. | 346/18 |
| 3,498,139 | 3/1970 | Powell | 73/519 |
| 2,884,238 | 4/1959 | Renz | 73/519 |

Primary Examiner—Richard C. Queisser
Assistant Examiner—Herbert Goldstein
Attorney—Michael S. Striker

[57] ABSTRACT

A tachographic measuring and indicating apparatus which is composed of at least one measuring unit, at least one transmission unit, and an indicator unit driven from the measuring unit through the transmission unit. The measuring unit, the transmission unit, and the indicator unit are detachably supported on a supporting casing in such a manner that each unit can be separately manufactured and combined with the other units, and also individually removed for service or adjustment.

11 Claims, 4 Drawing Figures

PATENTED AUG 8 1972

INVENTORS
Karl Vögtlin
Hermann Holtz
Norbert Helmschrott

INVENTORS
Karl Vögtlin
Hermann Holtz
Norbert Helmschrott

TACHOGRAPHIC MEASURING AND INDICATING APPARATUS

BACKGROUND OF THE INVENTION

The present invention relates to a tachographic measuring and indicating apparatus including at least one measuring device for measuring the speed of the car on which the instrument is mounted, or the number of revolutions of the motor of the car for indicating and recording the measured values and also the distance which the car has traveled. Apparatus of this type has a record carrier on which recording elements record graphs representing the time period during which the car moves, and other time periods when the car is stopped. The diagram card is driven by clockwork which, together with indicating means for the speed, time, and number of rotations, and an odometer indicating the travel distance, are provided in a housing part which is mounted for tilting movement on the casing of the instrument.

Apparatus of this type, whose purpose is mainly to indicate and record the speed which a car travels, to add the traveled distances in a counter, to record measured values on the diagram carrier, particularly when used for commercial vehicles, and for indicating the working times of several drivers, are generally constructed in such a manner that all parts are mounted on a base plate, generally an injection molded part, which has integral journals, guideways, bearings and bosses which are either cast simultaneously with the plate, or are later pressed into the same. The shaft of an eddy current speedometer, an oscillating pendulum recorder, magnetically operated writing arms for special recordings, for example representing the working time of the driver, or transmission elements representing the working time of the driver, or transmission elements between the measuring device and the recording means are all mounted on the base plate.

In accordance with the prior art, the several parts are assembled in one direction, namely starting with the parts closest to the base plate whereupon the other parts are successively assembled which results in the inserting of parts of different devices in spaced between the parts of other devices. For example, it is a general practice to mount the slide on which recording elements are supported, on a frame provided with guide rails, and secured to the base plate. On the same frame, the bearing of the measuring shaft which is driven by eddy current device, a gear transmitting the measured value to the recording slide, a return spring, and the eddy current member of the eddy current device are fixedly supported, and the bearing of the measuring shaft is mounted in the drive shaft of the measuring device. This manner of assembly in which the several elements can perform their necessary functions only when mounted on the base plate, which has the disadvantage that it is difficult to carry out repairs of individual parts, or replacement of the same.

For example, if the magnetic shaft of the eddy current device, which has a heavily loaded bearing, or a shaft of a transmission connected with the magnet shaft for driving the distance counter, are to be replaced, they are almost inaccessible and covered by parts of the recording device and of the measuring device, so that the almost entire instrument has to be disassembled, including parts which have no influence on the measured values, but perform other functions. This situation may occur even during the calibrating of the assembled instrument, if the previously highly magnetized magnet of the measuring device was too much demagnetized during the adaptation thereof to a desired characteristic.

It is also a disadvantage that a great number of parts has to be stored and assembled by workers along a conveyor band. Due to many adjustments of individual parts, a conveyor band with the parts can move only at a very low speed, and only when all parts mounted on the base plate are completely assembled, the apparatus can be tested. As a result, almost the entire instrument has to be assembled in successive operations, before the individual functions of the several parts of the instrument can be checked, so that a complete disassembly of the parts may become necessary when a function is not properly carried out, or one part of the device fails.

SUMMARY OF THE INVENTION

It is one object of the invention to overcome the disadvantages of known tachographic measuring and indicating apparatus, and to provide an apparatus consisting of units which can be separately manufactured, tested, and replaced.

Another object of the invention is to mount the several independent units of the apparatus in such a manner on a supporting wall that the assembly can take place from both sides of the wall.

With these objects in view, the present invention provides separate units for measuring the speed, for measuring the number of revolutions of the motor, for indicating and recording the speed and distance of traveling of a car, and for transforming the input speed as required for operating the indicator and recording means.

An apparatus according to the invention comprises at least one measuring unit including an input shaft adapted to be driven at varying rotary speeds, a measuring shaft representing the varying rotary speeds by the angular position thereof, and an output shaft rotating at a speed depending on the rotary speed; at least one transmission unit having input means driven by the output shaft, and output means connected by first and second connecting means with first and second indicating means which form an indicator unit. Supporting means support the measuring unit, the transmission unit, and the indicator unit so that the units can be separately assembled before they are mounted on the supporting means, and are individually detachable for service.

In the preferred embodiment of the invention, one or two measuring units, and a transmission unit connected to the same, are simultaneously inserted from one side into the casing of the apparatus to whose other side, the indicator unit is secured.

The supporting means include a tubular casing having a transverse wall formed with openings for the transmission unit and for at least one measuring unit, and the measuring unit is secured to the wall with the input shaft and the output shaft on one side of the same, and the measuring shaft on the other side of the same. The input means of the transmission unit is located on the respective one side of the wall, and the output means of the transmission unit are located on the respective other side of the wall. The indicator unit is also located on the other side of the wall and is attached to the casing for angular movement between an operative position closing the casing, and a servicing position in which a diagram card, driven by clockwork, is accessible. The casing is tubular and has an axis to which the support wall of the measuring and transmission units is transverse. The parts of these two units located on the side of the support wall remote from the indicator unit, are covered by a cover. The indicator unit is pivotally mounted on the casing so that it can be moved between the closing position abutting the casing, and the servicing position.

The phrase "indicator means" is used in the present application in a broad sense to include pointers, number wheels, recording elements and the like.

The indicator unit includes several indicator means connected with the transmission output shaft and with the measuring shaft when the transmission unit and the measuring unit or units are mounted on the transverse wall of the casing.

As compared with the prior art, the arrangement of the invention constitutes a great improvement since the several units can be individually detached, serviced, or exchanged. It is even possible to adapt the measuring unit to another range of measurements, and to exchange the indicator units. This operation can be carried out with simple tools in a servicing workshop. When the apparatus is assembled, premanufactured and adjusted units can be taken from a storage, or from a conveyor band, which considerably expedites the assembly of the apparatus.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
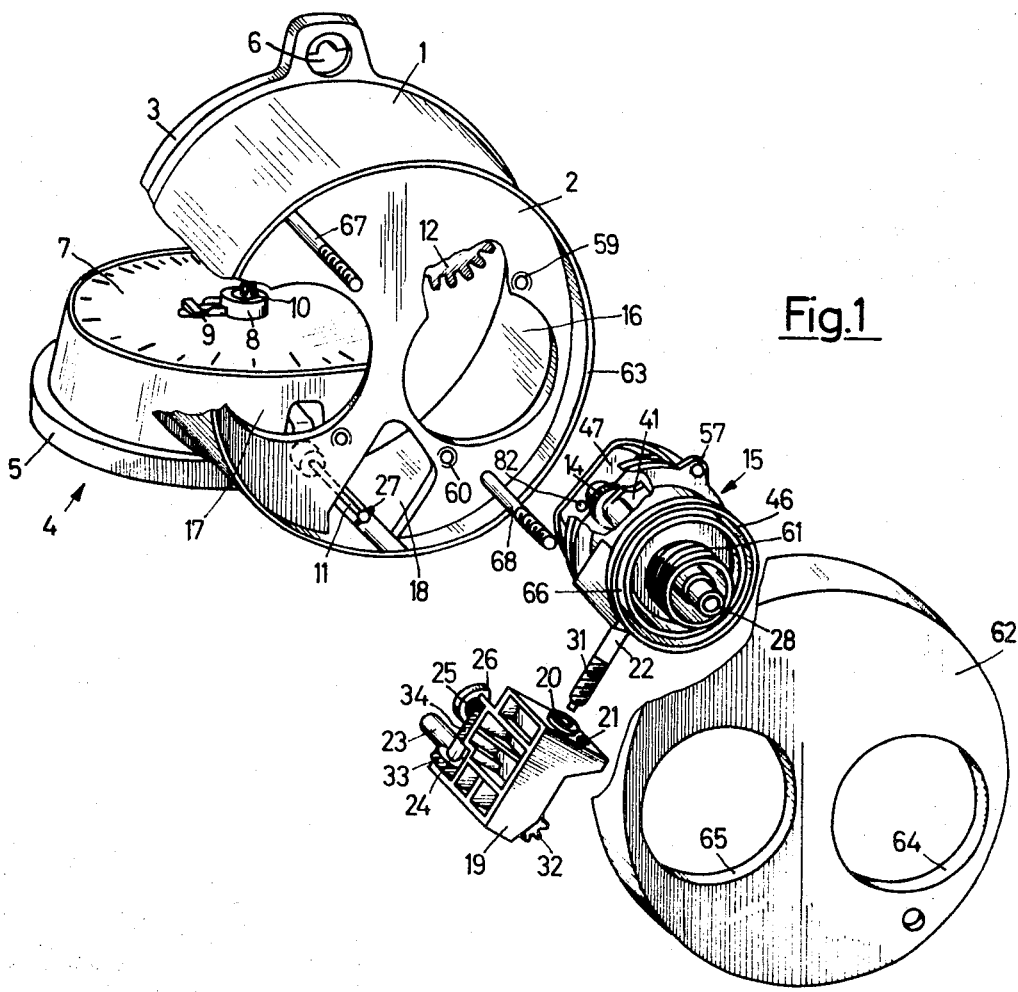
FIG. 1 is an exploded perspective view illustrating an apparatus according to the invention.

A cylindrical tubular casing 1 has a transverse support wall 2 and a flange 3 provided with lugs having openings 6. An indicator unit 4 has a flange 5 which abuts flange 3 when the indicator unit 4 is turned from the open position shown in FIG. 1 to a closed position about hinge means, not shown, on casing 1. A lock, not shown, mounted on the indicator unit 4 includes a catch engaging the opening 6 in the closed position of the indicator unit. The front of the pot-shaped indicator unit 4 is closed by a glass plate, not shown, through which indicator means including a graduated dial, and pointers for indicating speed, number of revolutions of the motor, and time, and a window in which the numbers of the number wheels of an odometer appear. A clockwork, not shown, is mounted in the pot-shaped indicator unit and drives clock hands, and a support for a diagram card 7 which is centered on a hollow sleeve 8 and held on its support by a spring biassed holding lever 9. An indicator shaft, not shown in FIG. 1, has an end projecting out of sleeve 8 and having a coupling half 10 which cooperates with another coupling half 80 shown in FIG. 3 when the indicator unit is closed. A speed indicating pointer, not shown, is mounted on this shaft and is visible through the glass plate on the front of the indicator unit 4. The indicator shaft and the pointer thereon are driven through the coupling 10, 80 from the measuring unit 15, as will be described hereinafter.

The indicator unit 4 also includes the shaft 11 of an odometer counter which is connected with a hollow shaft 23 of the transmission unit 19 by a sliding coupling including pins 27 guided in slots of the hollow shaft 23 so that shaft 11 can freely move during opening and closing of the indicator unit 4.

Figure 3:
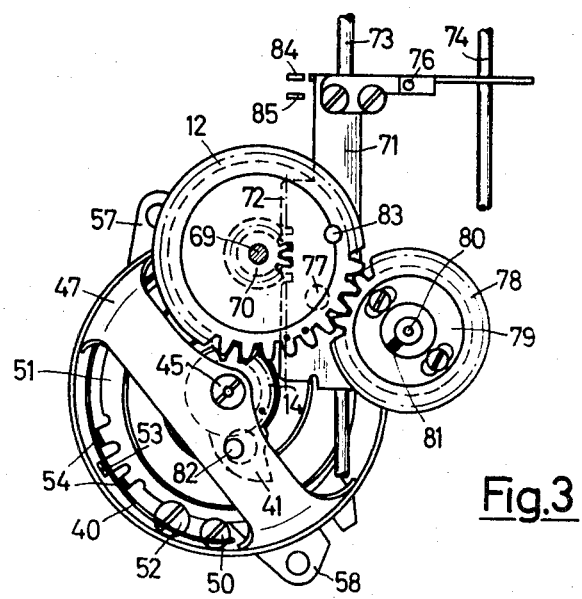
FIG. 3 is a side view illustrating connecting means between the measuring unit and the recording means in a zero position.
Figure 4:
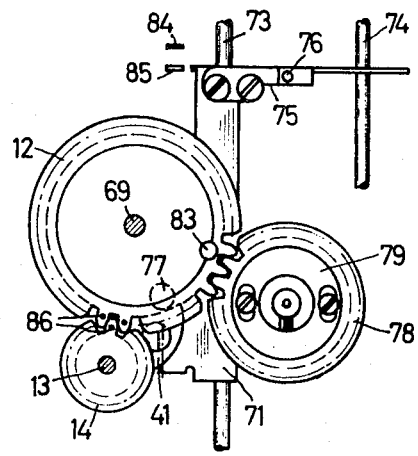
FIG. 4 is a fragmentary front view illustrating the connecting means between the measuring unit and the recording means in a zero position.

FIG. 1 shows a connecting gear 12 on the side of transverse wall 2 adjacent the indicator unit. As best seen in FIGS. 3 and 4, connecting gear 12 has a shaft 69 and is connected with a drive pinion 70 meshing with a rack 72 on the slide 71 carrying a holder 75 for a recording element 76 cooperating with the diagram card 7. When the measuring unit 15 is inserted into opening 16 of transverse wall 2 from the side remote from the indicator unit 4, a connecting gear 14 on a measuring shaft 13 of the measuring unit 15 engages connecting gear 12 in meshing engagement so that the same and pinion 70 are rotated. Connecting gear 12 meshes with a gear 78 carrying an adjustable plate 79 which serves as the other coupling half engaging coupling half 10 on the pointer shaft of the indicator unit by means of a central recess 80 and a radial slot 81. In the left part of casing 1, means for mounting an oscillating pendulum, or an electric pulse generator for driving oscillating recording means, not shown, are provided by which the time periods during which the car was moving, or different drivers were working, can be indicated in a manner which is not an object of the present invention.

In addition to the opening 16 into which the measuring unit 15 for measuring the speed and distance, is inserted, another opening 17 is provided for another measuring unit, not shown, which provides a representation of the numbers of revolutions of the motor of the car. Another rectangular opening 18 in transverse wall 2 is provided for the passage of a transmission unit 19 which is mounted on the casing 46 of the measuring unit 15.

Transmission unit 19 is formed by an integral molded bearing block which is attracted by screws, not shown, passing through bores 21, to housing 46 of measuring unit 15 in a position centered by a boss 20 engaging a corresponding opening through which a shaft 22 having a worm screw 31 projects into engagement with a worm gear 32 fixed on the hollow shaft 23 so that the same is driven from output shaft 22 of the measuring unit 15.

Figure 2:
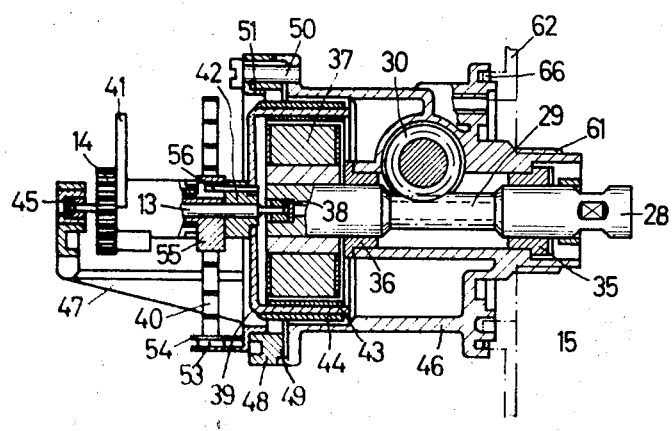
FIG. 2 is an axial section illustrating a measuring unit.

As best seen in FIG. 2, the input shaft 28 of the measuring unit 15 has a worm screw portion 29 meshing with the worm gear 30 secured to the output shaft 22 of measuring unit 15. The hollow shaft 23 has a worm screw portion, not shown, meshing with a worm gear 33 connected by a shaft 24 and a worm spindle 25 on the same with a worm gear 25 to which a heart cam 26 is fixedly secured.

Heart cam 26 and worm gear 25 are mounted for rotation on a journal portion of the bearing block 19, and cam 26 drives in the usual manner a recording element which records on diagram card 7 a zigzag-shaped graph representing the traveled distance.

As noted above, the shaft 11 of the indicator unit 4 is slidably connected with the hollow shaft 23 by a coupling pin 27 so that the rotary motion of shaft 23 is transmitted to shaft 11 which drives the odometer counter. This connection is maintained even if the indicator unit 4 is tilted to the illustrated open position. The intermediate shaft 24 is held by the worm screw on hollow shaft 23 and by the worm gear 25 in semi-circular bearings in the walls of the integral cast or molded bearing block 19.

It will be noted that, when bearing block 19 is secured to the housing 46 of measuring unit 15, the measuring unit can be inserted from the right as viewed in FIG. 1 into the opening 16, while the bearing block 19 of the transmission unit is inserted into the opening 18. The measuring unit 15, and the attached transmission unit are secured by screws passing through lugs 57 of the housing 46 into threaded openings 59 and 60 in the transverse wall 2.

The measuring unit 15 is best seen in FIG. 2. An input shaft 28 has a worm screw portion 29 which drives the worm gear 30 fixed to output shaft 22, as explained above. Input shaft 28 is mounted in two bearing bushings 35 and 36 in the housing 46 and carries at the end thereof a permanent magnet 37 which is formed with a bearing 38 for a measuring shaft 13 which is arranged coaxial with input shaft 28. Measuring shaft 13 carries a bell-shaped eddy current member 39, and is connected with the inner end of a spiral-shaped spring 40 whose outer end is secured between two projections 53 and 54 mounted on a circular ring 51 which is concentric to the axis of measuring unit 13 and housing 46, and is mounted within a ring 48 of a bearing bracket 47 for angular adjustment. Ring 51 can be arrested by a screw 52, shown in FIG. 3.

The bell-shaped eddy current member 39 has a hub portion 42 surrounding measuring shaft 13, and carries a temperature compensating ring 43, and a flux ring 44. The outer bearing 45 of measuring shaft 13 is mounted on bracket 47 which includes an attaching ring 48 with a boss 49 concentric to the axis of shaft 13 and being held in a corresponding cylindrical groove of housing 46 by screws 50. The inner end of spiral spring 40 is pressed into a bushing 55 which is connected by a pin 56 with the hub 42 of the bell-shaped eddy current member 39.

In order to secure the measuring unit 15, housing 46 has lugs 57, as described with reference to FIG. 1, for screws passing into threaded bores 59 and 60 in transverse support wall 2. The end of housing 46 remote from measuring shaft 13 has a threaded cylindrical surface 61 to which means for holding a flexible drive shaft connected to input shaft 28 can be threaded. The drive shaft, not shown, is driven from a rotary member whose rotary speed represents the speed of the car provided with the apparatus of the invention. A similar measuring unit, not shown, can be inserted into the opening 17 of support wall 2, and has an input shaft connected to the motor shaft for representing the number of revolutions of the same by the angular position of measuring shaft 13 which, in the measuring unit 15, represents the speed of the car.

On the right side of support wall 2, as viewed in FIG. 1, a cover 62 can be mounted for covering the parts of measuring unit 15 and transmission unit 19 which are located on the right side of wall 2. Threaded pins 67 and 68 are secured to wall 2 and adapted to project into corresponding openings in the end plate of cover 62 so that the same can be secured by nuts in a position in which its circular rim engages and abuts the rim 63 of tubular casing 1. Cover 62 is formed with two circular openings 64 and 65 which are surrounded by circular walls projecting into circular grooves 66 in the end flange of the housing 46, as best seen in FIG. 2. The attaching thread 61 and input shaft 28 project out of opening 64.

As shown in FIGS. 3 and 4, gear 14 on measuring shaft 13 is in meshing engagement with the connecting gear 12 when the apparatus is assembled. Connecting gear 12 is mounted on a shaft 69 together with the pinion 70 which is connected with connecting gear 12 for rotation, and meshes with the rack 72 on a recording slide which is mounted for movement with recording element 76 which is resiliently mounted by a holder 75. Slide 71 moves along guide rails 73 and 74 mounted in casing 1 on the left side of support wall 2, as viewed in the drawing, where gears 14, 12 and 78, which meshes with gear 12, are also located. As mentioned above, the coupling portion 79, 80, 81 secured to connecting gear 78 is coupled with the coupling portion 10 shown in FIG. 1 in the center of the indicator unit 4. The position of coupling part 79 can be adjusted since it is provided with slots through which screws project into gear 78.

The measuring unit 15 is separately assembled and calibrated, and then attached to the bearing block 19 of the transmission unit, before it is mounted on wall 2 of casing 1.

In addition to the indicator unit 4, recording means are provided in casing 1 on the left side of wall 2, and these recording means not only include the recording means 71 to 76, but also an oscillating recording pendulum for indicating movement or stopping of the car, or other recording elements oscillated by an impulse generator. The recording element 76 records the speed of the car on the diagram card 7 which is rotated by a clockwork. These recording devices are inserted from the left into the interior of the casing 1, and the guide rails 73 and 74, with recording slide 71, are mounted on a frame inserted into casing 1 before assembly of all units.

In order to facilitate the assembly of measuring unit 15 from the right side of support wall 2 into opening 16, the spring 40 of the eddy current device 37, 39 is pretensioned before the measuring unit 15 in inserted into opening 16. The pretensioning is carried out in the usual manner to such a degree as to supress the initial low speed range. This pretensioning, which for practical reasons is selected greater than would be required only for the supression of the initial range of low speed, is effected by an auxiliary pin inserted through the bore 82 into the bearing bracket 47 and cooperating with a part secured to the measuring shaft 13, that is either the eddy current member 39 or the connecting gear 14, and preferably a zero stop 41. The auxiliary pin holds the spring in the pretensioned condition.

It is the purpose of the zero stop 41 to operate with the stop pin 77 on the connecting gear 12 for determining the zero position of the measuring shaft, and of correlated recording and indicator means. The position of the zero stop 41 directly connected with measuring shaft 13 is selected so that the play in the connecting gears 14, 12, 70, 72 between the measuring shaft 13 and slide 71 does not influence the measured values, and can be compensated, depending on the position of the apparatus, by the weight of the slide 7, or by a comparatively weak auxiliary spring, not shown. Therefore the zero stop 41 directly mounted on the measuring shaft 13 forms part of the measuring unit 15.

The placement of the stop pin 77 cooperating with zero stop 41 on the connecting gear 12 is determined by the selected angle of the eddy current member 39 and measuring shaft 13, which is, for example, greater than 360°. If the angle of the measuring shaft were smaller than 360°, it would be sufficient to provide a fixed zero stop for the measuring shaft 13, and for the recording and indicating means driven from the same, on the housing 46 of the measuring unit 15.

The measuring unit 15, and more particularly its connecting gear 14, is placed in meshing engagement with the connecting gear 12 which has been placed in a predetermined position by setting of a pin in bore 83 which is correlated with a bore in slide 71. By pulling the arresting pins out of bores 82 and 83, the zero stop 41 is turned by the action of spring 40 in counterclockwise direction, as viewed in the drawing, and abuts stop pin 77 on connecting gear 12 so that the spring 40 is pretensioned. In this manner, the zero position of the measuring unit, and of the indicating and recording means is obtained, as shown in FIG. 4. By additional marks 84 and 85, which indicate the position of the recording slide 71 in the assembled position and in the zero position, the assembly of the apparatus can be further simplified. Furthermore, marks 86 are provided on teeth of connecting gear 12 and connecting gear 14 which mesh in the zero position of the measuring unit, so that the correct assembly can be checked.

The measuring unit 15 has been described to contain an eddy current device for transforming rotary motion into an angular position of the measuring shaft 13 representing the speed. Evidently, any corresponding measuring unit including electronic measuring means could be mounted on the wall 2 in the same manner as the eddy current measuring unit 15.

It will be understood that each of the elements described above, or two or more together, may also find a useful application in other types of tachographic measuring and indicating apparatus differing from the types described above.

While the invention has been illustrated and described as embodied in a tachographic measuring and indicating apparatus comprising a measuring unit, a transmission unit, an indicator unit, and supporting means for supporting the units in assembled condition, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are ingended to be comprehended within the meaning and range of the equivalence of the following claims.

What is claimed as new and desired to be protected by Letters Patent is set forth in the appended claims.

We claim:

1. Tachographic apparatus comprising at least one measuring unit including an input shaft adapted to be driven at a varying rotary speed, a measuring shaft for representing the varying rotary speed by the angular position thereof, and a housing for supporting said measuring unit and having attaching means located intermediate said measuring shaft and said input shaft, said measuring shaft having a first connector part projecting from said housing; an indicator unit including speed recording first indicator means and a second connector part for engaging said first connector part for forming connecting means connecting said first indicating means with said measuring shaft for rotation, and a rotary holder for a diagram card cooperating with said speed recording first indicating means; supporting means including a substantially tubular main casing, and a partitioning wall fixed in said main casing extending transversely through said main casing spaced from the ends of said main casing, and having at least one opening; said housing of said measuring unit being detachably secured by said attaching means to said wall passing through said opening with said input shaft located on one side of said wall, and said measuring shaft located on the other side of said wall; a housing for said indicator unit mounted on said main casing on said other side of said wall for movement between an open servicing position in which said first and second connector parts are separated, and an operative position closing said main casing so that said first and second connector parts engage each other; said holder, said card, and said measuring shaft being accessible in said open servicing position; and a cover detachably closing said main casing on said one side of said wall and having an opening for access to said input shaft of said measuring unit, said measuring unit being accessible for detachment from said wall when said cover is detached.

2. Apparatus as claimed in claim 1 wherein the end of said tubular casing on said one side is spaced a smaller axial distance from said wall than the end of said casing located on said other side of said wall.

3. Apparatus as claimed in claim 1 wherein said measuring unit includes a threaded tubular member at one end of said housing for attaching drive means for said input shaft, and a bearing bracket mounted on said housing for turning adjusting movement about the axis of said measuring shaft and supporting the same for rotation.

4. Apparatus as claimed in claim 3 wherein said measuring unit includes a zero stop mounted on said measuring shaft; wherein said first connector part includes a first connector gear fixed on said measuring shaft, and said second connector part includes a second connector gear detachably meshing with said first connector gear in said operative position, and another stop mounted on said second connector gear and engaging said zero stop in a zero position of said measuring unit.

5. Apparatus as claimed in claim 4 wherein said measuring unit includes an eddy current device between said input shaft and said measuring shaft and having a spring connected with pretension to said measuring shaft; and means for holding said spring in said pretensioned condition during assembly of said measuring unit on said supporting means so that a low initial range of measured values is suppressed in the zero position of said measuring shaft.

6. Apparatus as claimed in claim 5 wherein said spring is pretensioned to a greater degree than required for the zero position; and comprising means for holding said measuring shaft and said spring in pretensioned condition during assembly, and including a stationary member having a bore adapted to receive an auxiliary stop pin; and marks for indicating during assembly desired assembly positions of cooperating parts of said measuring unit.

7. Tachographic apparatus comprising at least one measuring unit including an input shaft adapted to be driven at a varying rotary speed, a measuring shaft for representing the varying rotary speed by the angular position thereof, and a housing for supporting said measuring unit and having attaching means located intermediate said measuring shaft in said input shaft; an indicator unit including speed recording first indicating means and connecting means connecting said first indicating means with said measuring shaft and a rotary holder for a diagram card cooperating with said speed recording first indicating means; supporting means including a substantially tubular main casing, and a partitioning wall fixed in said main casing extending transversely through said main casing spaced from the ends of said main casing, and having at least one opening; said housing of said measuring unit being detachably secured by said attaching means to said wall passing through said opening with said input shaft located on one side of said wall, and said measuring shaft located on the other side of said wall, said connecting means including a first connector gear fixed to said measuring shaft, and a second connector gear mounted on said other side of said wall in said casing meshing separably with said first connector gear; a housing for said indicator unit mounted on said main casing on said other side of said wall for movement between an open servicing position, and an operative position closing said main casing; said holder, said card, and said measuring shaft being accessible in said open servicing position; and a cover detachably closing said main casing on said one side of said wall and having an opening for access to said input shaft of said measuring unit, said measuring unit being accessible for detachment from said wall when said cover is detached.

8. Apparatus as claimed in claim 7 comprising a third indicator means having an indicator shaft mounted in said indicator unit and a coupling having one coupling half secured to said third indicator means; a third connecting gear mounted in said casing on said other side and meshing with said first connecting gear; and wherein the other coupling half of said coupling is secured to said third connecting gear.

9. Tachographic apparatus comprising at least one measuring unit including an input shaft adapted to be driven at a varying rotary speed, and a measuring shaft for representing the varying rotary speed by the angular position thereof; an indicator unit including speed recording first indicating means and first connecting means connecting said first indicating means with said measuring shaft, and a rotary holder for a diagram card cooperating with said speed recording first indicating means; supporting means including a substantially tubular main casing, and a partitioning wall fixed in said main casing extending transversely through said main casing spaced from the ends of said main casing, and having at least one opening; said measuring unit being detachably secured to said wall passing through said opening with said input shaft located on one side of said wall, and said measuring shaft located on the other side of said wall; a housing for said indicator unit mounted on said main casing on said other side of said wall for movement between an open servicing position, and an operative position closing said main casing; said holder, said card, and said measuring shaft being accessible in said open servicing position; a cover detachably closing said main casing on said one side of said wall and having an opening for access to said input shaft of said measuring unit, said measuring unit being accessible for detachment from said wall when said cover is detached; and a transmission unit mounted on said measuring unit on said one side of said wall for detachment with said measuring unit from said wall when said cover is detached, said transmission unit including transmission input means located on said one side of said wall and transmission output means located on the other side of said wall; said measuring unit including an output shaft rotating at a speed depending on said rotary speed of said input shaft and driving said transmission input means, said output shaft of said measuring unit being located on said one side of said wall; and said indicator unit including at least one distance recording second indicator means and second connecting means connecting said second indicator means with said transmission output means.

10. Apparatus as claimed in claim 9 wherein said transmission unit includes an integral bearing block, and wherein said transmission output means include a plurality of output shafts mounted on said bearing block, a cam mounted on one of said output shafts, wherein an other output shaft of said transmission output means is connected by said second connecting means with said second indicator means; and wherein said indicator unit includes recording means driven from said cam.

11. Apparatus as claimed in claim 10 wherein said measuring unit has a housing; and wherein said bearing block is detachably secured to said housing in a position in which said output shaft of said measuring unit is in driving connection with said input means shaft of said transmission unit so that said measuring unit and said transmission unit can be simultaneously detachably attached to said wall.

* * * * *